United States Patent
Krebs et al.

(10) Patent No.: US 10,532,393 B2
(45) Date of Patent: Jan. 14, 2020

(54) METHOD FOR PRODUCING A CAGE OF A ROLLER BEARING

(71) Applicant: Aktiebolaget SKF, Göteborg (SE)

(72) Inventors: Philipp Krebs, Gerolstein (DE);
Gilbert Peters, Utrecht (NL);
Sebastian Ziegler, Bamberg (DE);
Gregory A. Zimmermann, Erie, PA (US)

(73) Assignee: AKTIEBOLAGET SKF, Gothenburg (SE)

( * ) Notice: Subject to any disclaimer, the term of this patent is extended or adjusted under 35 U.S.C. 154(b) by 202 days.

(21) Appl. No.: 15/311,695

(22) PCT Filed: Jun. 26, 2015

(86) PCT No.: PCT/EP2015/064505
§ 371 (c)(1),
(2) Date: Nov. 16, 2016

(87) PCT Pub. No.: WO2016/001080
PCT Pub. Date: Jan. 7, 2016

(65) Prior Publication Data
US 2018/0178269 A1  Jun. 28, 2018

(30) Foreign Application Priority Data
Jul. 3, 2014  (GB) .................................. 14118913.

(51) Int. Cl.
*B21D 53/12* (2006.01)
*F16C 33/38* (2006.01)
(Continued)

(52) U.S. Cl.
CPC .............. *B21D 53/12* (2013.01); *F16C 19/06* (2013.01); *F16C 33/385* (2013.01);
(Continued)

(58) Field of Classification Search
CPC . B21D 53/12; G06F 17/5086; G06F 17/5018; F16C 19/06; F16C 33/3887;
(Continued)

(56) References Cited

U.S. PATENT DOCUMENTS 5,459,674 A * 10/1995 Ide ........................ F01D 25/164
703/1
7,891,880 B2 * 2/2011 Hofmann ................ F16C 19/26
384/523

(Continued)

FOREIGN PATENT DOCUMENTS

DE  102010034962 A1  2/2012
GB  2521391 A  * 6/2015 ............ B22F 3/1055
(Continued)

OTHER PUBLICATIONS

Farzin H. Montazersadgh and Ali Fatemi, Stress Analysis and Optimization of Crankshafts Subject to Dynamic Loading, Aug. 2007.*

(Continued)

*Primary Examiner* — Jacob J Cigna
*Assistant Examiner* — Michael W Hotchkiss
(74) *Attorney, Agent, or Firm* — Garcia-Zamor Intellectual Property Law, LLC; Ruy Garcia-Zamor; Bryan Peckjian

(57) ABSTRACT

A method for producing a cage having a body with multiple pockets for rolling elements, the method providing: a) defining a cage basis geometry that provides a radial outer and/or inner surface for contacting a bearing ring and multiple surfaces of the pockets for contacting the rolling elements; b) defining a part of the radial outer and/or inner surfaces as being unalterable surfaces; c) calculating the cage stress distribution when applying a defined stress force from a mathematical model; d) defining cage volume sec-
(Continued)

tions where the stress is below a defined threshold; e) removing a part of the volume sections defined according to step d) taking into account the unalterable surfaces according to step b) and the surfaces of the pockets that are unalterable surfaces; f) defining the cage geometry with the removed volume sections; g) manufacturing the cage according to the geometry as defined according to step f).

9 Claims, 2 Drawing Sheets

(51) Int. Cl.
    *F16C 19/06*     (2006.01)
    *G06F 17/50*     (2006.01)

(52) U.S. Cl.
    CPC ...... *F16C 33/3806* (2013.01); *F16C 33/3856* (2013.01); *F16C 33/3887* (2013.01); *G06F 17/5018* (2013.01); *G06F 17/5086* (2013.01); *F16C 2220/24* (2013.01); *F16C 2326/43* (2013.01); *F16C 2326/47* (2013.01)

(58) Field of Classification Search
    CPC ............... F16C 33/3856; F16C 33/385; F16C 33/3806; F16C 2326/43; F16C 2326/47; F16C 2220/24; B21P 15/003; B33Y 80/00; B29C 64/00
    USPC ...................................... 29/898.067; 384/572
    See application file for complete search history.

(56) References Cited

U.S. PATENT DOCUMENTS

| | | | | |
|---|---|---|---|---|
| 8,348,514 | B2* | 1/2013 | Schweitzer | F16C 33/4611 |
| | | | | 384/572 |
| 8,814,437 | B2* | 8/2014 | Braun | B29C 67/0051 |
| | | | | 29/898.067 |
| 9,500,230 | B2* | 11/2016 | Hiller | F16C 33/6659 |
| 9,945,419 | B2* | 4/2018 | Pauskar | F16C 33/38 |
| 2009/0304321 | A1* | 12/2009 | Horton | F16C 33/385 |
| | | | | 384/572 |
| 2011/0091144 | A1* | 4/2011 | Oishi | F16C 33/546 |
| | | | | 384/548 |
| 2012/0039558 | A1* | 2/2012 | Shimazu | B22C 9/28 |
| | | | | 384/572 |
| 2013/0004112 | A1* | 1/2013 | Kawamura | F16C 33/414 |
| | | | | 384/572 |
| 2014/0193111 | A1* | 7/2014 | Kenmochi | F16C 33/3887 |
| | | | | 384/534 |
| 2017/0023061 | A1* | 1/2017 | Sanz | F16C 33/3831 |

FOREIGN PATENT DOCUMENTS

| | | | |
|---|---|---|---|
| JP | 2012026500 A | * | 2/2012 |
| JP | 2013077058 A | * | 4/2013 |
| JP | 2013077058 A | * | 4/2013 |

OTHER PUBLICATIONS

Fatemi (Stress Analysis and Optimization of Crankshafts Subject to Dynamic Loading) (Year: 2007).*
Fatemi, Stress Analysis and Optimization of Crankshafts Subject to Dynamic Loading, Aug. 2007 (Year: 2007).*
Machine Translation of JP2013077058A (Year: 2013).*
Shenoy, Dynamic Load Analysis and Optimization of Connecting Rod, May 2004 (Year: 2004).*
Montazersadgh, et al.: "Stress Analysis and Optimization of Crankshafts Subject to Dynamic Loading", The University of Toledo Prepared for the Forging Industry Educational Research Foundation (FIERF) and American Iron and Steel Institute (AISI), Aug. 2007.

* cited by examiner

METHOD FOR PRODUCING A CAGE OF A ROLLER BEARING

CROSS REFERENCE TO RELATED APPLICATIONS

This is a United States National Stage Application claiming the benefit of International Application Number PCT/EP2015/064505 filed on Jun. 26, 2015 which claims the benefit of British Patent Application 1411891.3 filed on Jul. 3, 2014, both of which are incorporated herein by reference in their entireties.

FIELD OF THE INVENTION

The invention relates to a method for producing a cage of a roller bearing, wherein the cage provides a base body with a plurality of pockets for receiving rolling elements.

BACKGROUND OF THE INVENTION

Cages of roller bearings are usually rotationally symmetric components that are normally made by stamping or injection molding for medium and high production volumes and by turning and milling for low volume production or if high strength and/or special materials are required. In the latter case, manufacturing starts typically with a tube material that is then turned to the right dimension. The receiving pockets of the cage are then machined.

This classical production technology means however, that any additional removal of material which is not needed for the strength of the cage (for example to reduce weight) increases production time and cost. If the material is at a location which cannot be reached by a turning or milling tool, it cannot be removed.

Despite the fact that this material is not needed and removed later it must still be paid for and thus causes cost. Hence the raw material cost is higher than necessary with respect to the required strength of the cage.

For applications that are not weight-sensitive the machining time is thus minimized and extra weight is accepted.

It is an object of the present invention to develop a method for the production of a cage which allows overcoming the mentioned drawbacks. Thus, it should become possible to produce a cage in a cost efficient manner which is light but has the required strength and stiffness. Consequently, the required material should be minimized and located only at those regions where it is necessary to carry the load without relevant deformations of the cage.

BRIEF SUMMARY OF THE INVENTION

A solution according to the invention is characterized in that the method provides the following steps:

a) Definition of a basis geometry of the cage, wherein the basis geometry provides a radial outer and/or inner surface for contacting or facing a bearing ring and a plurality of surfaces of the pockets for contacting the rolling elements;

b) Definition of at least a part of the radial outer and/or inner surfaces as being unalterable surfaces;

c) Calculation of the stress distribution in the cage when applying a defined force by means of a mathematical model;

d) Detection of volume sections of the cage in which the stress is below a defined threshold;

e) Removal of at least a part of the volume sections defined according to above step d) from the basis geometry, taking into account the unalterable surfaces according to step b) and preferably at least a part of the surfaces of the pockets which are unalterable surfaces;

f) Definition of the cage geometry with the removed volume sections;

g) Manufacturing of the cage according to the geometry as defined according to step f) by means of a 3-D printing process.

Preferably, after step f) and before step g) the steps d) to e) are repeated at least once; the steps d) to e) are even repeated several times according to a specifically preferred embodiment of the method.

With respect to the removal of at least a part of the surface of the pocket it should be mentioned that not the whole pocket surface must be kept. It is only necessary to geometrically define the position of the rolling element and have concave contact. Therefore, many variants of unalterable surfaces can be considered. For example, surface parts in circumferential and axial direction of the bearing can be kept as unalterable. Also, respective parts of the surface can be rotated by an angle, e.g. by 45°.

During above step e) pre-defined minimum dimensions of the geometry of the cage or its parts can be considered respectively. The minimum dimensions concern specifically the thickness and/or the cross-section of the cage or its parts.

The mentioned mathematical model is preferably a FEA model (Finite Element Analysis).

The steps d) to e) are repeated—according to a further embodiment of the method—until at least one void is created in the base geometry of the cage.

Preferably, at least 10% of the volume, specifically preferred at least 30% of the volume, of the basis geometry of the cage is removed during all steps e) which are carried out. A respective manufactured cage had e.g. 60% less volume and weight than a cage manufactured without the proposed process.

The basis geometry of the cage according to above step a) is preferably hollow cylindrical.

According to one possibility, the cage is 3-D printed from a plastic material. during step g).

Also, the cage can be produced from a metal material. Here, specifically a light metal is considered like titanium, aluminium or magnesium. Also, steel can be employed.

Metal cages can be especially suitable due to more strength reserves which allow a high degree of material removal and also with respect to a higher accuracy when using the 3-D-printing technology.

By the proposed method a lightweight cage is obtained which has significant less weight than a cage with a base geometry which is given at the beginning of the process. In spite of this a quite stable and stiff cage is obtained which carries the occurring loads without a relevant deformation.

A typical bearing cage is optimized for stamping, turning, milling and/or injection molding. An additive manufacturing method like the 3-D-printing of the material of the cage allows an easy and cost-efficient production of a geometry of the cage which is not possible with traditional manufacturing technologies or which are at least very laborious and thus expensive.

By the proposed method, the geometry of the cage can be optimized with respect to weight and strength issues.

The proposed cage is suitable for many applications; preferred applications are in the field of aerospace and other fields where lightweight design or low inertia is required of beneficially. Special application like super precision bearings, aerospace and racing should be mentioned in this connection.

For weight-sensitive applications like aerospace or racing an optimized trade-off is found due to the invention between weight, strength and production time of the cage.

The cage can be designed between 30% and 70% lighter while maintaining its functionality and reducing the amount of raw material which is required and thereby potentially raw material cost. In additive manufacturing raw material costs are more significant than with traditional manufacturing because powder is more expensive than bulk steel.

The reduced inertia is a further advantage in applications with high acceleration and deceleration. In some applications the reduced stiffness can also be an advantage because the bearing can react to misalignment and acceleration/deceleration in a more flexible way.

BRIEF DESCRIPTION OF THE SEVERAL VIEWS OF THE DRAWING

The drawings show an embodiment of the invention.

DETAILED DESCRIPTION OF THE INVENTION

Figure 1:
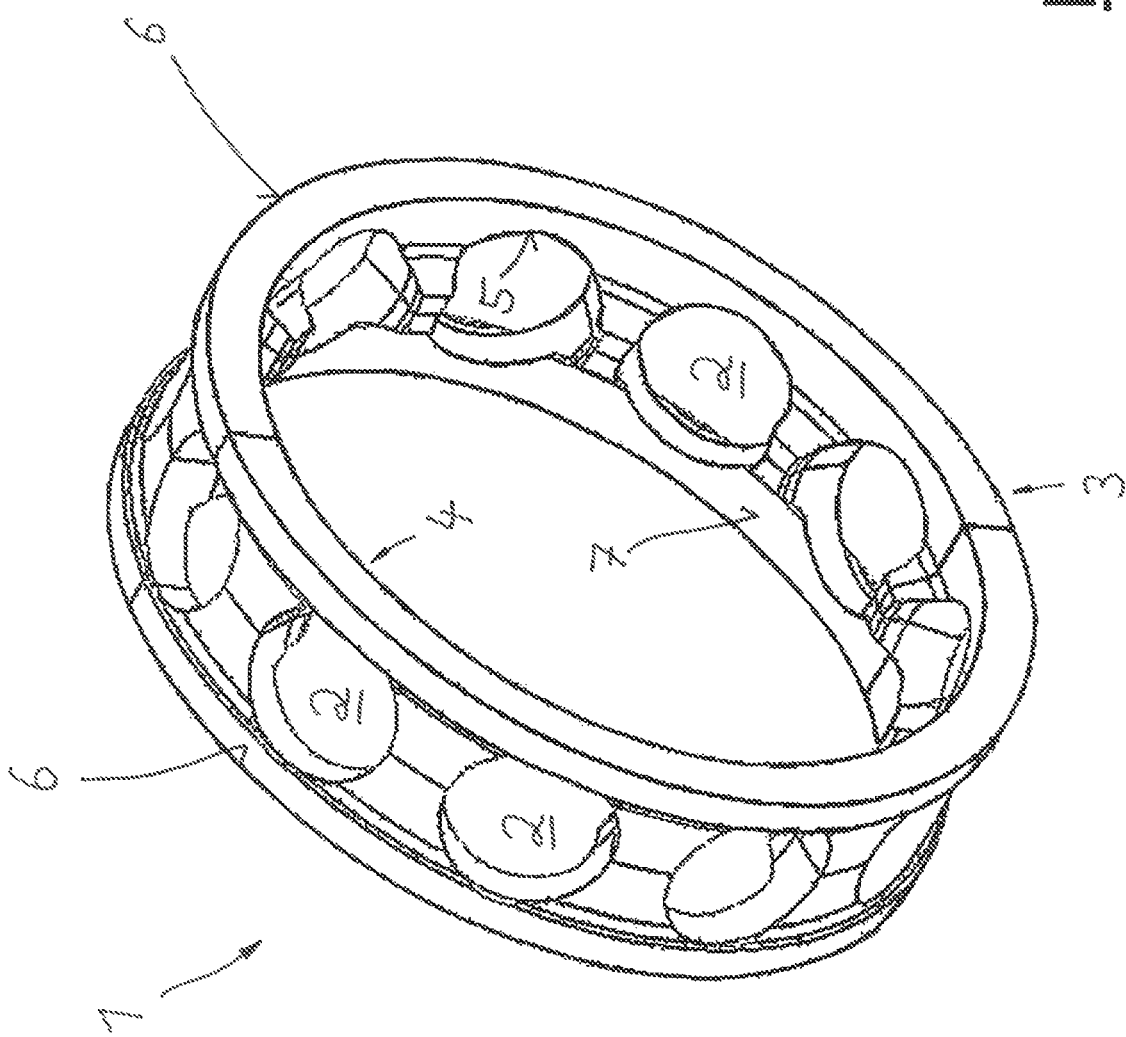
FIG. 1 shows a perspective view of a cage of a roller bearing, wherein its geometry is a base geometry and not yet changed.

In FIG. 1 a cage 1 is shown with a basis geometry which is basically hollow-cylindrical. The cage 1 has a plurality of pockets 2 for receiving rolling elements and a radial outer surface 3 as well as a radial inner surface 4. The pockets 2 have a surface 5 for contacting the rolling element (not depicted).

The process of the production of a cage 1 starts with the definition of the basis geometry of the cage 1 as shown in FIG. 1.

The next step is to define certain unalterable surfaces. More specifically, a part of the radial outer surface, namely two ring-shaped lateral outer surfaces of the hollow-cylindrical structure of the cage 1, as well as the surfaces 5 of the receiving pockets 5 are such unalterable surfaces; those surfaces must remain to fulfill the function of the cage. The outer surface 6 establishes the guiding of the cage; the surfaces 5 guide each rolling element in the pocket 2.

Also, a radial inner surface 7 can be defined to be such an unalterable surface. This is specifically the case when the cage 1 is guided with its radial inner side at a bearing ring.

Now, a calculation of the stress distribution in the cage 1 is carried out by means of a FEA method. For doing so defined stress forces are applied to the mathematical model of the cage.

Subsequently, volume sections 8 (see FIG. 2) of the cage 1 are defined in which the stress is below a defined threshold. That is, regions which must transmit a high tension must remain unaltered. In contrast, regions with a low tension—which are identified by the FEA calculation—are not so necessary for the force transmittal and thus those regions can be defined as the volume sections 8 in question.

Then, at least a part of the mentioned volume sections 8 are removed from the basis geometry of the cage 1, taking into account the unalterable surfaces 6 of the radial outer surface and the surfaces 5 of the pockets 2.

The cage geometry is then defined with such removed volume sections.

Figure 2:
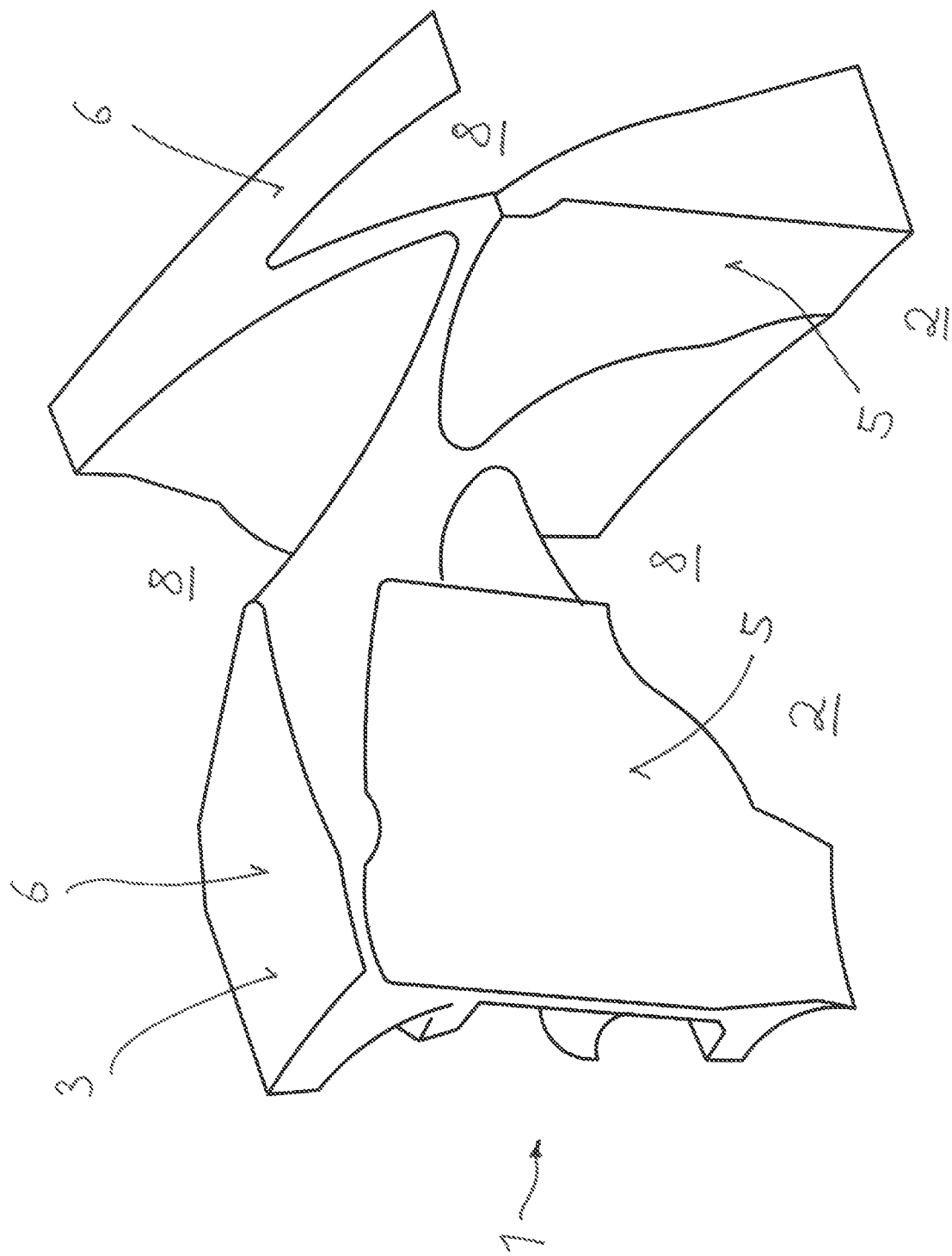
FIG. 2 shows a perspective view of a section of the cage, wherein now a change in the base geometry was done by removal of parts of the volume of the base geometry.

If those steps are carried out once or several times the cage geometry is amended and a structure is created which is shown for a section of the cage 1 in FIG. 2. It can be seen that only those sections of the cage remain which are really necessary for the transmittal of forces during the operation of the cage 1.

From this geometry a set of data can be created which is used to manufacture the cage according to the defined geometry.

The cage 1 is manufactured by means of a 3-D-printing process.

So, the invention can also be described as follows:

An algorithm is used to optimize the topology of the cage. This is done by defining the surfaces which the algorithm may not modify. This includes the contact surfaces with the rolling elements and a small-width surface on the outer (and/or inner) circumference of the cage.

Then, a typical load is applied to the cage pockets (for example 100 N on both sides of the pocket, an appropriate centrifugal force and optionally shock loads) within the mathematical model of the cage. The algorithm then removes as much material as possible but so that the functionality of the cage is still maintained.

This can be done in various levels of weight reduction up to 70%.

To reduce the simulation time of the mathematical model the cage can be divided into a quarter of a pocket. The full model can be obtained by mirroring the part at both planes adjacent to the ball contact surface and replicating it around the rotation axis so that a full cylindrical part is obtained.

The resulting component shows the desired weight reduction but still fulfills the functional requirements regarding stiffness and strength.

As the cage and outer (and/or inner) ring contact surfaces are still intact, the outer ring (and/or inner ring) guidance is maintained and the rolling elements (balls) are constrained in the same way as in the case of an unmodified cage.

Since the highest stresses are normally in the axial walls of the pockets virtually no material is removed there. Some support material remains underneath the ball contact surface to support the pockets against each other and to connect the ball contact surface to the cage bars on the axial sides of the cage. The connection between the outer ring (and/or inner ring) contact and the axial sides is made so that the maximum stiffness is achieved.

REFERENCE NUMERALS

1 Cage
2 Pockets for receiving rolling elements
3 Radial outer surface
4 Radial inner surface
5 Surfaces of the pocket
6 Unalterable radial outer surface
7 Unalterable radial inner surface
8 Volume sections to be removed

The invention claimed is:

1. A method for producing a cage of a roller bearing for use in a specific application, the cage having a base body with a plurality of pockets for receiving of rolling elements, the method comprising the following steps: a) defining a basis geometry of the cage, wherein the basis geometry comprises a radial outer and/or inner surface for contacting or facing a bearing ring and a plurality of surfaces of the pockets for contacting the rolling elements; b) defining at least a part of the radial outer and/or inner surfaces as being unalterable surfaces; c) using a mathematical model to calculate an estimate of a stress distribution to be expected in the cage if a defined force is exerted on the cage, wherein the step of using the mathematical model to calculate the estimate of the stress distribution comprises calculating stress for a model of one quarter of a single one of the pockets and mirroring the model about two planes and replicating a resultant model of a single pocket around an axis of rotation of the cage to create an updated model of the cage; d) detecting volume sections of the cage in which the stress is below a defined threshold which allows for satisfactory operation of the cage in the specific application, wherein the step of detecting volume sections of the cage includes identifying at least one first region of the cage which must transmit a first tension and at least one second region of the cage which must transmit a second tension, lower than the first tension, during normal operation of the cage; e) removing at least a part of the volume sections defined according to above step d) from the basis geometry, taking into account the unalterable surfaces according to step b) and at least a part of the surfaces of the pockets which are unalterable surfaces; f) defining the cage geometry with the removed volume sections; g) manufacturing the cage according to the geometry as defined according to step f) by means of a 3-D-printing process using a single material; h) wherein after step f) and before step g) the steps c) to e) are repeated at least once in an iterative fashion, wherein at least sixty percent (60%) of the volume of the basis geometry of the cage is removed during all steps e) which are carried out.

2. The method according to claim 1, wherein the steps d) to e) are repeated several times.

3. The method according to claim 1, wherein the mathematical model is a FEA model (Finite Element Analysis).

4. The method according to claim 1, wherein the steps d) to e) are repeated until at least one void is created in the base geometry of the cage.

5. The method according to claim 1, wherein the basis geometry of the cage according to step a) is hollow cylindrical.

6. The method according to claim 1, wherein the cage is produced from a plastic material.

7. The method according to claim 1, wherein the cage is produced from a metal material.

8. The method according to claim 7, wherein the metal material is selected from a group consisting of titanium, aluminum and magnesium.

9. The method according to claim 7, wherein the metal material is steel.

* * * * *